(12) United States Patent
Wang et al.

(10) Patent No.: US 12,541,017 B2
(45) Date of Patent: Feb. 3, 2026

(54) IN-VEHICLE OCCUPANCY SENSING VIA HIGH-RESOLUTION ULTRA-WIDEBAND POWER DELAY PROFILE

(71) Applicant: Robert Bosch GmbH, Stuttgart (DE)

(72) Inventors: Shuai Wang, Fairfax, VA (US); Yunze Zeng, San Jose, CA (US); Vivek Jain, Sunnyvale, CA (US)

(73) Assignee: Robert Bosch GmbH (DE)

( * ) Notice: Subject to any disclaimer, the term of this patent is extended or adjusted under 35 U.S.C. 154(b) by 14 days.

(21) Appl. No.: 18/400,409

(22) Filed: Dec. 29, 2023

(65) Prior Publication Data

US 2025/0216541 A1   Jul. 3, 2025

(51) Int. Cl.
| | | |
|---|---|---|
| *G01S 13/56* | (2006.01) | |
| *B60H 1/00* | (2006.01) | |
| *B60R 21/015* | (2006.01) | |
| *G01S 13/02* | (2006.01) | |

(52) U.S. Cl.
CPC .......... *G01S 13/56* (2013.01); *B60H 1/00742* (2013.01); *B60R 21/0153* (2014.10); *G01S 13/0209* (2013.01)

(58) Field of Classification Search
CPC . G01S 13/56; G01S 13/0209; B60H 1/00742; B60R 21/0153
See application file for complete search history.

(56) References Cited

U.S. PATENT DOCUMENTS

| | | |
|---|---|---|
| 2020/0348406 A1 | 11/2020 | Jain et al. |
| 2025/0046176 A1 | 2/2025 | Cheikh |

FOREIGN PATENT DOCUMENTS

| | | | | |
|---|---|---|---|---|
| EP | 4235610 A2 * | 8/2023 | ............. | G01S 7/411 |
| WO | WO-2023110357 A1 * | 6/2023 | ......... | G01S 13/0209 |

OTHER PUBLICATIONS

International Search Report for PCT/EP2024/087542, Completed on Mar. 11, 2025, 5 Pages.

* cited by examiner

*Primary Examiner* — Long T Tran
*Assistant Examiner* — Charles J Brauch
(74) *Attorney, Agent, or Firm* — Dickinson Wright PLLC

(57) ABSTRACT

A method of sensing occupancy of a vehicle using ultra-wide band (UWB) communication includes transmitting and receiving a UWB signal within the vehicle, obtaining channel impulse response (CIR) data corresponding to the UWB signal as received within the vehicle, calculating power delay profile (PDP) results for the CIR data, determining, based on the calculated PDP results, the occupancy of the vehicle, and at least one of generating, storing, and transmitting occupancy sensing results based on the determined occupancy of the vehicle. The occupancy sensing results include data that indicates at least one of a presence of occupants within the vehicle, a number of occupants within the vehicle, and locations of occupants within the vehicle.

18 Claims, 12 Drawing Sheets

$$H[1] \quad H[2] \quad \cdots \quad H[p] \quad H[p+1] \quad \cdots \quad H[q] \quad \cdots \quad H[q+p-1] \quad \cdots \quad H[M]$$

$$\underbrace{\begin{bmatrix} H[1] & H[2] & \cdots & H[p] \\ H[2] & H[3] & \cdots & H[p+1] \\ \vdots & & & \vdots \\ H[q] & H[q+1] & \cdots & H[q+p-1] \end{bmatrix}}_{H'(p \times q)} = \underbrace{\begin{bmatrix} 1 & 1 & \cdots & 1 \\ \Omega_1 & \Omega_2 & \cdots & \Omega_N \\ \vdots & \vdots & & \vdots \\ \Omega_1^{p-1} & \Omega_2^{p-1} & \cdots & \Omega_N^{p-1} \end{bmatrix}}_{\Omega'(p \times N)} \underbrace{\begin{bmatrix} \gamma_1 & \Omega_1 \gamma_1 & \cdots & \Omega_1^{q-1} \gamma_1 \\ \gamma_2 & \Omega_2 \gamma_2 & \cdots & \Omega_2^{q-1} \gamma_2 \\ \vdots & \vdots & & \vdots \\ \gamma_N & \Omega_N \gamma_N & \cdots & \Omega_N^{q-1} \gamma_N \end{bmatrix}}_{r'(N \times q)}$$

FIG. 6

IN-VEHICLE OCCUPANCY SENSING VIA HIGH-RESOLUTION ULTRA-WIDEBAND POWER DELAY PROFILE

TECHNICAL FIELD

The present disclosure relates to systems and methods for sensing occupants of a vehicle using ultra-wideband (UWB) communication.

BACKGROUND

A vehicle typically implements various features (safety features, comfort features, entertainment features, etc.) that affect one or more occupants of the vehicle. Some features may be responsive to vehicle occupancy sensing. For example, by determining which seats are occupied, specific airbags may be enabled for deployment while other airbags are disabled. Similarly, other vehicle systems, such as interior lighting, audio systems, heating and air conditioning, power accessories, etc. may be controlled responsive to vehicle occupancy sensing.

SUMMARY

A method of sensing occupancy of a vehicle using ultra-wide band (UWB) communication includes transmitting and receiving a UWB signal within the vehicle, obtaining channel impulse response (CIR) data corresponding to the UWB signal as received within the vehicle, calculating power delay profile (PDP) results for the CIR data, determining, based on the calculated PDP results, the occupancy of the vehicle, and at least one of generating, storing, and transmitting occupancy sensing results based on the determined occupancy of the vehicle. The occupancy sensing results include data that indicates at least one of a presence of occupants within the vehicle, a number of occupants within the vehicle, and locations of occupants within the vehicle.

In other features, the method includes determining the occupancy of the vehicle includes comparing the calculated PDP results to reference PDP results and determining the occupancy of the vehicle based on the comparison. The method may include obtaining, with a known arrangement of occupants within the vehicle, the reference PDP results, and storing the reference PDP results. Obtaining and storing the reference PDP results includes obtaining and storing a plurality of reference PDP results each corresponding to a different known arrangement of occupants within the vehicle. Calculating the PDP results for the CIR data includes applying a signal classification algorithm to the CIR data. The signal classification algorithm is a multiple signal classification (MUSIC) algorithm. Calculating the PDP results includes determining a channel frequency response based on the CIR data, generating a matrix based on the channel frequency response, and providing the matrix as an input to the MUSIC algorithm. In other features, the method further includes at least one of downsampling the matrix and providing the downsampled matrix to the MUSIC algorithm and, to obtain the CIR data, filtering the UWB signal as received and excluding selected filter taps to reduce aliasing. Determining the occupancy of the vehicle includes at least one of detecting an intrusion into the vehicle and detecting gestures performed by occupants of the vehicle.

In other features, the method further includes controlling at least one function of the vehicle based on occupancy of the vehicle. The at least one function includes at least one of control of heating and cooling systems, activation and deactivation of airbags, control of interior lighting, control of an audio and/or video system, and transmission of warnings or notifications.

In other features, determining the occupancy of the vehicle includes using a machine learning (ML) model configured to calculate the occupancy of the vehicle using the calculated PDP results.

Other embodiments include systems, one or more processors or processing devices, or other circuitry configured to implement functions corresponding to the principles of the present disclosure.

BRIEF DESCRIPTION OF THE DRAWINGS

FIG. 6 illustrate formation of an example steering matrix according to the present disclosure.

DETAILED DESCRIPTION

Figure 1A:
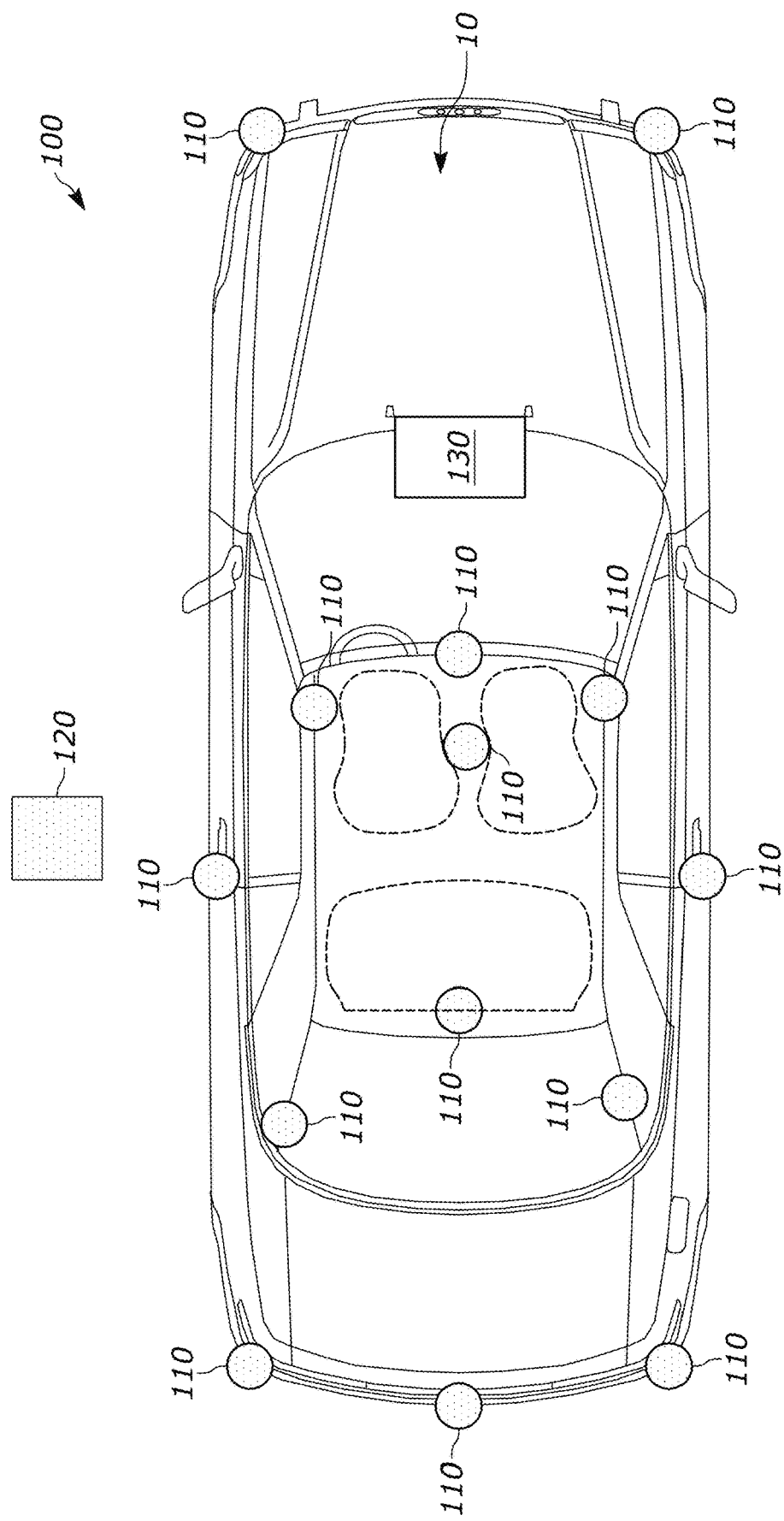
FIG. 1A is an illustrative example of a vehicle having an ultra-wide band (UWB) infrastructure and sensing system located within a vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions. By way of another example, "a system node" configured to transmit a UWB signal and receive a UWB signal refers to (1) one system node transmitting the UWB signal and that same node receiving a UWB signal, or (2) one system node transmitting a UWB signal and a different system node receiving the UWB signal.

While various vehicle systems and functions may be responsive to vehicle occupancy sensing, implementing accurate and effective in-vehicle sensing/detection systems is a difficult. For example, some vehicles may use weight sensors to sense or detect occupancy. However, due to installation complexity and high cost, weight sensors may only be implemented for occupants in front seats of vehicles.

In other examples, various wireless technologies may be used for sensing the environment in and around a vehicle. For example, key fobs have become common to perform various functions, such as automatically unlocking doors of the vehicle when a user is located within the vicinity of the vehicle and/or enabling the user to start the vehicle. To perform these functions, the key fob wirelessly communicates with the vehicle to perform an authentication process. In these and other examples, vehicles may implement various radio frequency (RF) communication technologies. For passive entry systems (PES) and comfort entry go (CEG) applications, a low frequency (LF) technology may be used to perform key fob proximity detection and localization functions. For remote keyless entry, ultra-high frequency (UHF) technology may be used. However, LF and UHF systems may not be able to effectively perform detection of users within a vehicle. Further, LF and UHF systems may be vulnerable to security breaches such as "relay" attacks.

In some examples, vehicles may implement ultra-wide band (UWB) technology instead of or in addition to LF and UHF technology for various functions. For example, U.S. Pat. No. 10,573,104, which is incorporated herein by reference, discloses a UWB system configured to perform automotive functions such as vehicular access (i.e., keyless entry).

However, incorporating UWB technology into in-vehicle occupancy sensing presents various technical challenges. For example, vehicle occupants may not possess UWB-enabled smart devices, which limits the use of UWB ranging features. Further, it is difficult to directly sense changes within a vehicle environment using UWB channel information.

In-vehicle occupancy sensing systems and methods according to the present disclosure are configured to use UWB channel information to sense vehicle occupancy. For example, channel impulse response (CIR) data is collected from multiple transmitter/receiver pairs. Various features of the CIR data are analyzed and compared to previously-collected CIR data from the same vehicle environment. Both presence and location of vehicle occupants are determined based on the comparison between the CIR data and the previously-collected CIR data. In one example, a high-resolution power delay profile (PDP) is extracted from the CIR data and compared to a PDP of the previously-collected CIR data. Changes to the PDP are indicative of both presence and location of occupants in the vehicle as described herein in more detail.

As used herein, a PDP corresponds to an average power of a channel (i.e., as indicated by the CIR data) as a function of delay relative to an arrival time of a first portion (i.e., signal propagation path) of a received signal. In various examples, the PDP may be calculated based on a comparison between the CIR of the received signal and a CIR of a reference signal (e.g., the CIR of a received signal when the vehicle has no occupants).

FIG. 1A is a diagram of an example of a vehicle 10 with a UWB system 100 configured to provides in-vehicle sensing according to the present disclosure. In some examples, the UWB system 100 may be further configured to provide one or more other functions (e.g., vehicle access). In this embodiment, the UWB system 100 includes a plurality of system nodes 110 arranged at various locations of the vehicle 10. It is appreciated that the particular number of system nodes 110 and particular locations of the system nodes 110 depend on the desired accuracy and performance, as well as the particular make and model of the vehicle 10. In some examples, to perform vehicle access functions, the system nodes 110 are configured to communicate with a target device 120 (which may be mobile and/or portable) to determine a relative position and/or location of the target device 120.

Figure 1B:
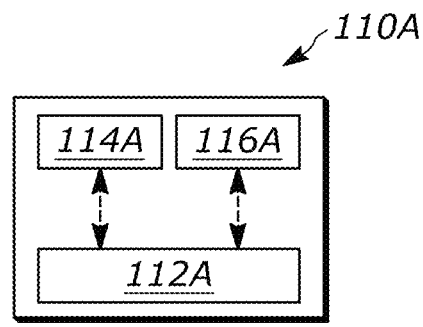
FIG. 1B is a diagram of an example of a communication system node according to an example embodiment the present disclosure.
Figure 1C:
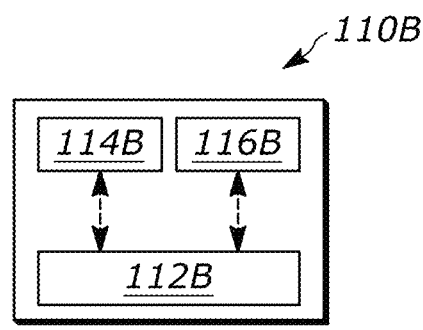
FIG. 1C is a diagram of an example of a dual-mode system node according to an example embodiment of the present disclosure.
Figure 1D:
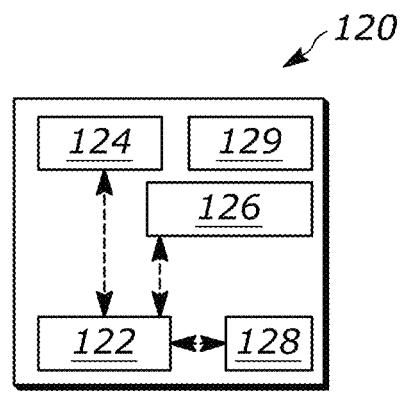
FIG. 1D is a diagram of an example of a target device according to an example embodiment of the present disclosure.

In an example embodiment, the UWB system 100 may be configured such that a particular system node is designated as a primary system node and other system nodes are designated as secondary system nodes such that primary system node controls communications with the secondary system nodes and collects data from the secondary system nodes for the purpose of localizing the target device 120. Processing of the data collected from the system nodes 110 to localize the target device 120 is performed by the primary system node or a processing system 130. In an example embodiment, the processing system 130 is or includes an electronic control unit (ECU). In at least one embodiment, UWB communications are exchanged between the system nodes 110 and the target device 120 to enable localization of the target device 120. With further reference to FIGS. 1B, 1C, and 1D, each system node 110 is a communication system node 110A or a dual-mode system node 110B. Either system node 110A or 110B can be referred to as a UWB system node, and the system node may be configured for other types of additional communication.

FIG. 1B shows an example of the communication system node 110A according to an embodiment. In the illustrated embodiment, each communication system node 110A comprises a processor 112A, memory 114A, and a transceiver 116A. The memory 114A is configured to store program instructions that, when executed by the processor 112A, enable the respective communication system node 110A to perform various operations described elsewhere herein, including localization of the target device 120 and sensing of a predetermined region. The memory 114A may be of any type of device configured to store information accessible by the processor 112A, such as write-capable memories, read-only memories, or other non-transitory computer-readable mediums. Additionally, the processor 112A includes any hardware system, hardware mechanism or hardware component that processes data, signals, or other information. The processor 112A may include a system with a central processing unit, multiple processing units, dedicated circuitry for achieving functionality, or other systems. In an example, the communication system node 110A includes a microcontroller, which contains at least the processor 112A and the memory 114A along with programmable input/output peripherals.

The transceiver 116A includes at least a UWB transceiver configured to communicate with the target device 120 and may include any of various other devices configured for communication with other electronic devices, including the ability to send communication signals and receive communication signals. In some embodiments, the transceiver 116A comprises multiple UWB transceivers and/or multiple UWB antennas arranged in an array. In an example embodiment, the transceiver 116A includes at least one further transceiver configured to communicate with the other system nodes 110 (e.g., communication system nodes 110A, dual-mode nodes 110B, etc.), the target device 120, and/or the processing system 130, via a wired or wireless connection.

In some examples, the UWB system 100 may include one or more dual-mode system nodes. FIG. 1C shows an example of a dual-mode system node 110B according to an embodiment. The dual-mode system node 110B is configured to switch between a UWB communication mode and a UWB radar mode. More specifically, in the illustrated embodiment, the dual-mode system node 110B comprises at least a processor 112B, a memory 114B, and a transceiver 116B. The processor 112B includes any hardware system, hardware mechanism or hardware component that processes data, signals, or other information. The processor 112B may include a system with a central processing unit, multiple processing units, dedicated circuitry for achieving functionality, a digital signal processor (DSP), or other processing technology. The memory 114B is configured to store program instructions that, when executed by the processor 112B, enable the respective system node 110 to perform various operations described elsewhere herein, including localization of the target device 120, sensing of a sensing region, switching between communication mode and radar mode, performing signal processing, etc. The memory 114B may be of any type of device configured to store information accessible by the processor 112B, such as write-capable memories, read-only memories, or other non-transitory computer-readable mediums. In an example, the dual-mode system node 110B includes a microcontroller, which contains at least the processor 112B and the memory 114B along with programmable input/output peripherals.

The transceiver 116B includes at least a transceiver, which is configured switch between transmitting/receiving UWB communication and transmitting/receiving UWB radar, respectively. The transceiver 116B is configured to communicate with the target device 120 and may include any of various other devices configured for communication with other electronic devices, including the ability to send communication signals and receive communication signals.

In some embodiments, the transceiver 116B comprises multiple UWB transceivers and/or multiple UWB antennas arranged in an array. The multiple UWB transceivers and/or multiple UWB antennas are configured to transmit/receive UWB communications and UWB radar, respectively. In an example embodiment, the transceiver 116B includes at least one further transceiver configured to communicate with the other system nodes 110 (e.g., communication system nodes 110A, dual-mode system nodes 110B, etc.), the target device 120, and/or the processing system 130, via a wired or wireless connection.

The dual-mode system node 110B is configured to switch between communication mode and radar mode, respectively. Also, the dual-mode system node 110B is configured to transmit pulses in radar mode and communication mode, respectively. The duration of those pulses and/or number of those transmitted pulses differs in these two distinct modes. For example, one or more pulses generated in the radar mode differ from one or more pulses generated in communication mode with respect to pulse shape, repetition frequency, pulse power, number of pulses, duration of pulse transmission, any appropriate pulse feature, or any number and combination thereof.

In an example embodiment, for instance, the dual-mode system node 110B includes one or more switching mechanisms, implemented via hardware, software, or a combination thereof, which is configured to provide the communication mode and the radar mode, respectively, and enable the dual-mode system node 110B to switch between these two modes. As a non-limiting example, for instance, the dual-mode system node 110B may include a switch connected to an antenna and a radio integrated circuit (IC), which may be present in FIG. 1C but not shown in this high-level block diagram. This switch controls whether an antenna is connected to at least one transmitting or receiving circuit. Further, this switch controls whether the antenna is connected to radar receiving circuit or communication mode receiving circuit. In the case that there are multiple antennas in the dual-mode system node 110B, then the dual-mode system node 110B may include a switch per antenna to control its operation (e.g., transmitting or receiving) or a switch to choose an antenna and a switch to enable operation (e.g., transmitting or receiving radar or receiving communication).

As discussed above, the dual-mode system node 110B is advantageously configured to selectively switch between radar mode and communication mode. More specifically, the dual-mode system node 110B is configured to operate in communication mode or radar mode. For example, when in communication mode, each dual-mode system node 110B is enabled to contribute to in-vehicle sensing throughout the vehicle 10 via UWB communication. And, when in radar mode, each dual-mode system node 110B is configured to provide targeted sensing for specific locations (e.g. seats). In addition, the use of UWB radar contributes to providing health status data (e.g., heart rates, breathing rates) of at least one living being in the vehicle 10, as will be described further herein. Systems and methods of the present disclosure as described below in more detail may be implemented with only the communication system nodes 110A, only the dual-mode system nodes 110B, or both.

FIG. 1D shows a non-limiting example of the target device 120, which may comprise a key-fob, a smart phone, a smart watch, or any suitable electronic device. In the illustrated embodiment, the target device 120 comprises at least a processor 122, memory 124, transceivers 126, an I/O interface 128, and a battery 129. The memory 124 is configured to store program instructions that, when executed by the processor 122, enable the target device 120 to perform various operations described elsewhere herein, including communicating with the system nodes 110 for the purpose of localizing the target device 120. The memory 124 may be of any type of device configured to store information accessible by the processor 122, such as a memory card, ROM, RAM, hard drives, discs, flash memory, or other non-transitory computer-readable mediums. Additionally, the processor 122 includes any hardware system, hardware mechanism or hardware component that processes data, signals or other information. The processor 122 may include a system with a central processing unit, multiple processing units, dedicated circuitry for achieving functionality, or other systems.

The transceivers 126 includes at least an UWB transceiver configured to communicate with the system nodes 110 (e.g., communication system nodes 110A, dual-mode nodes 110B, etc.) and may also include any of various other devices configured for communication with other electronic devices, including the ability to send communication signals and receive communication signals. In an example embodiment, the transceivers 126 further include additional transceivers which are common to smart phones and/or smart watches, such as Wi-Fi or Bluetooth® transceivers and transceivers configured to communicate via for wireless telephony networks. The I/O interface 128 includes software and hardware configured to facilitate communications with the one or more interfaces (not shown) of the target device 120, such as tactile buttons, switches, and/or toggles, touch screen displays, microphones, speakers, and connection ports. The battery 129 is configured to power the various electronic devices of the target device 120 and may comprise a replaceable or rechargeable battery.

In an example embodiment, the processing system 130 is configured to control and monitor various electronic functions relating to the vehicle 10. The processing system 130 may be in communication with the nodes 110 for operating the nodes and/or processing data received by the nodes. For example, the nodes 110 may be used to perform the automotive functions described herein, such as starting the vehicle 10 when the processing system 130 determines target device 120 is located within the vehicle 10. The processing system 130 according to the present disclosure is also configured to determine the occupancy of the vehicle 10, including determining presence, number/quantity, and location of occupants in the vehicle 10.

Although described with respect to sensing/detecting occupancy, the processing system 130 may be further configured to perform other functions, including, but not limited to: (1) detecting the state of the vehicle 10 (e.g., whether the vehicle 10 is unoccupied or occupied; or whether a door, window, or trunk is open); (2) detecting human movement or activity in or near the vehicle; (3) detecting the occupancy when a driver/passenger approaches (or leaves) the vehicle 10; and (4) detecting an intrusion into the vehicle 10. Various warnings or vehicle system operations/functions can be triggered based on these detections, including, but not limited to, adjustments/control of heating and cooling systems, activation and deactivation of airbags, control of interior lighting, control of an audio/video system (e.g., volume control of specific speakers), transmission of warnings or notifications to drivers, owners or operators, emergency or law enforcement personnel, etc., and so on. Warnings or notifications may include, but are not limited to, seatbelt reminders, warning of the presence of children or pets (e.g., in response to detection of occupants in the rear seats that may have been inadvertently left within the vehicle 10), intrusion warnings, etc.

In some examples, the processing system 130 includes at least one electronic control unit (ECU). In an example, the processing system 130 includes a microcontroller and/or microprocessor. In an example, the processing system comprises at least a processor, a memory, and an I/O interface. The memory is configured to store program instructions that, when executed by the processor, enable the processing system 130 to perform various operations described elsewhere herein, including sensing presence and location of occupants. The memory may be of any type of device configured to store information accessible by the processor, such as a memory card, ROM, RAM, hard drives, discs, flash memory, or other computer-readable medium. Additionally, the processor includes any hardware system, hardware mechanism or hardware component that processes data, signals or other information. The processor may include a system with a central processing unit, multiple processing units, dedicated circuitry for achieving functionality, or other systems. The I/O interface includes software and hardware configured to facilitate monitoring and control of various electronics and their functions.

Figure 2:
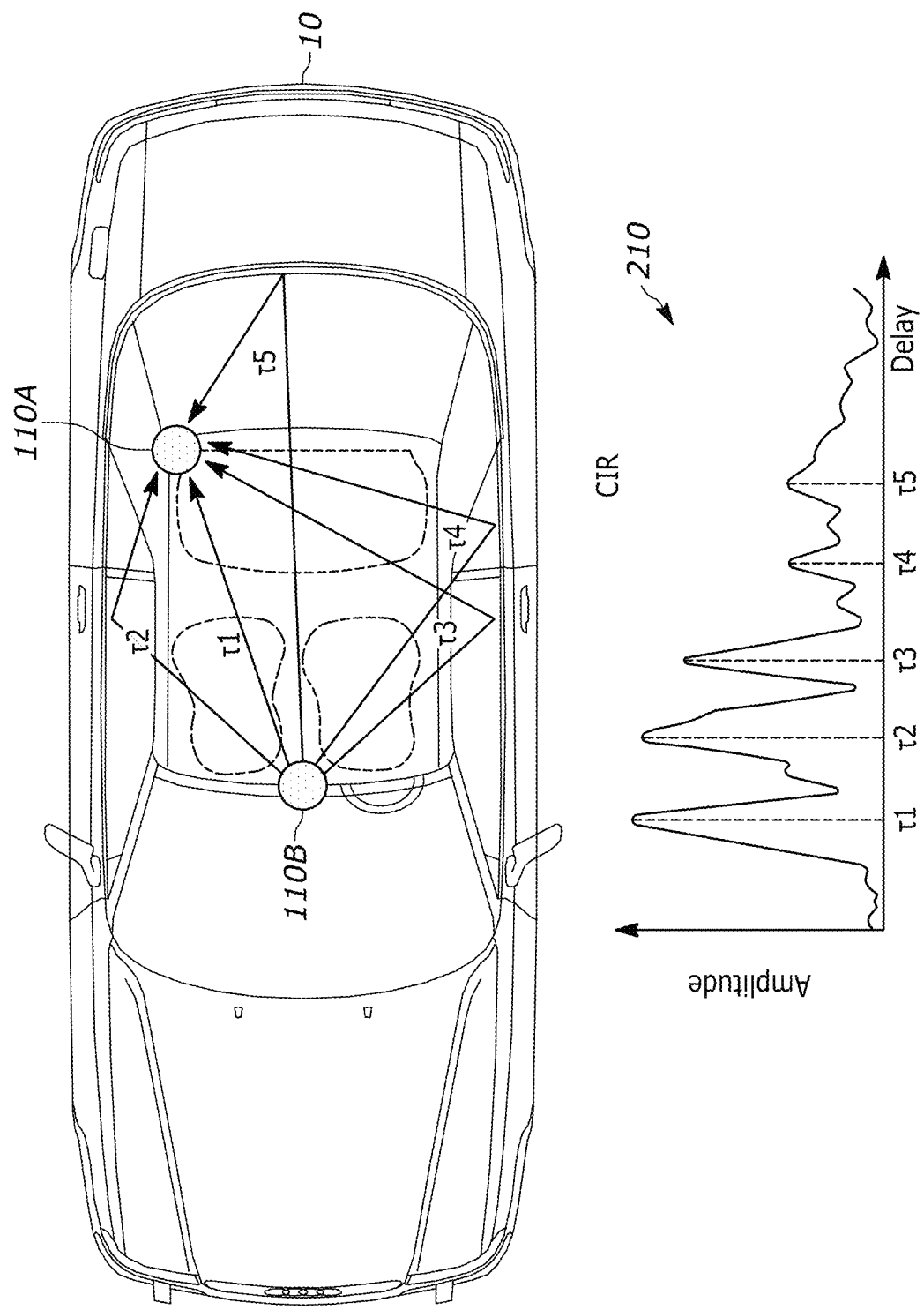
FIG. 2 is an illustrative example of a channel impulse response (CIR) of a received signal according to an example embodiment of the present disclosure.

The various nodes 110 (including nodes 110A and/or 110B) may be configured as a transceiver for sending and receiving UWB messages. One or more of nodes 110 may periodically transmit (or blink) a UWB message. One or more nodes 110 may perform the UWB-based occupancy sensing using the channel state information such as channel impulse response (CIR) computed by a given receiver. For instance, FIG. 2 illustrates node 110B transmitting a UWB message that may be received by node 110A. While only one example is described in FIG. 2, either node 110A or 110B may be a different type of node described herein. As illustrated, portions or components of a UWB signal may be reflected at various points around the vehicle 10, resulting in the components traveling different paths and arriving at the node 110A at different times (shown by $\tau_1$-$\tau_5$).

The CIR of the UWB signals generally refers to the response of the wireless communication channel though which the signals travel. As the UWB signals are transmitted from one node and received by another node, during the transmission the signal encounters various obstacles and environmental factors that cause the signal to attenuate, scatter, and reflect. One of these obstacle may be a human (or animal) occupant within the vehicle. The CIR describes how the channel behaves in the time domain and represents the time-varying characteristics of the channel, including the delays, attenuations, and phase shifts that the signal experiences while traveling from the transmitter to the receiver.

Graph 210 illustrates the CIR that may be calculated by node 110A based on the reflected UWB message (i.e., as transmitted by the node 110B and reflected by various surfaces, objects, etc. within the vehicle 10). More specifically, the graph 210 illustrates amplitudes of various portions of the CIR as received at different times ($\tau_1$-$\tau_5$). As shown, the portion of the CIR corresponding to $\tau_1$ may have a greatest amplitude and a least amount of time delay as a result of not being reflected at any point within the vehicle 10 between node 110B to node 110A. Conversely, the portion of the CIR corresponding to $\tau_5$ may have a significantly smaller amplitude and a largest amount of delay as a result of being reflected by a rear point (e.g., the trunk) of the vehicle 10 before being received by the node 110B. Other portions of the CIR corresponding to $\tau_2$, $\tau_3$, and $\tau_4$ may have different amplitudes and delays based upon their traveled path and their reflection within the vehicle 10.

A UWB signal transmitted and received by nodes 110 can contain a packet or message, such as those described in U.S. Pat. Nos. 10,573,104 and 11,402,485, the entirety of which are incorporated by reference herein. In particular, the processors described herein are configured to processes CIR data to determine, for example, presence and location of occupants in the vehicle 10. In an example, the UWB system 100 (e.g., the nodes 110 and the processing system 130) may be configured to (and/or include circuitry configured to) implement the systems and methods of the present disclosure to sense the presence and location of occupants based on a PDP associated with the CIR data as described below in more detail.

Figure 3:
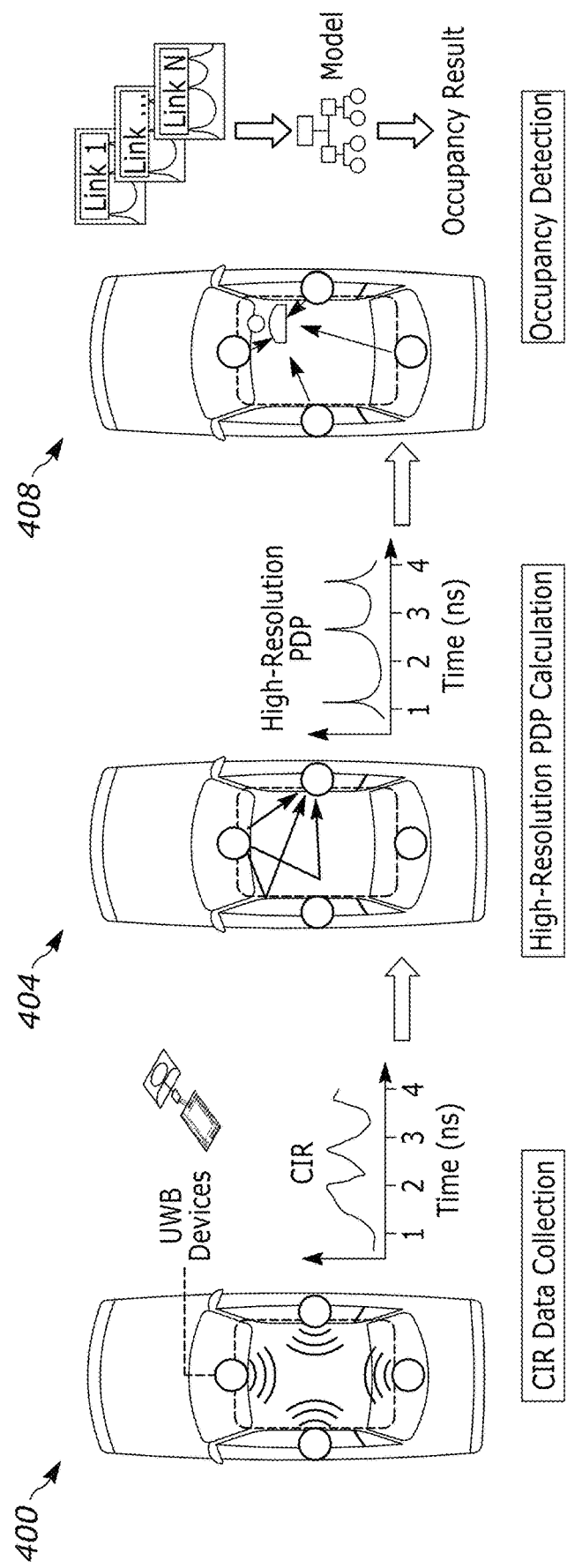
FIG. 3 illustrates example process flow of occupancy sensing systems and methods of the present disclosure.

As shown in FIG. 3, occupancy sensing systems and methods according to the present disclosure are configured to collected CIR data from multiple links of transmitters and receivers installed in a vehicle as shown at 400. The multiple Tx-Rx facilitate determination of the PDP from various angles, providing a better representation of signal propagation changes caused by an occupant. A high-resolution PDP is calculated from the collected CIR data as shown at 404. The PDPs obtained from the multiple Tx-Rx links are provided to a classification model as shown at 408 to detect an occupancy status of the vehicle.

Typically, resolution of CIR amplitude is limited by UWB device design (e.g., by design of associated physical (PHY) layer devices), making calculation of PDP difficult. Occupancy sensing systems and methods of the present disclosure overcome these and other limitations (e.g., biased phase information caused by hardware imperfections) and achieve high-resolution PDP calculation and accurate occupancy detection by fully analyzing amplitude and phase information of the CIR data.

As used herein, detecting "occupancy" of a vehicle may include detecting intrusions into the vehicle. Detecting intrusions may include, but is not limited to, detecting unwanted or unauthorized entry into the vehicle by individuals. Intrusions may be detected while the vehicle is unoccupied by a driver or authorized passengers (e.g., while at a home, in a parking lot, etc.) and/or while the vehicle is occupied by the drive or authorized passengers (e.g., while the vehicle is stopped at a traffic signal or stop sign).

Further, while described with respect to occupancy sensing, systems and methods of the present disclosure may be further configured to detect gestures or other motions performed by occupants and perform various actions based on the detected gestures. The one or more actions may include, but are not limited to, adjusting vehicle system operations/functions, such as adjusting/controlling of heating and cooling systems, controlling of interior lighting, controlling an audio/video system (e.g., controlling of specific speakers), etc.

Figure 4A:
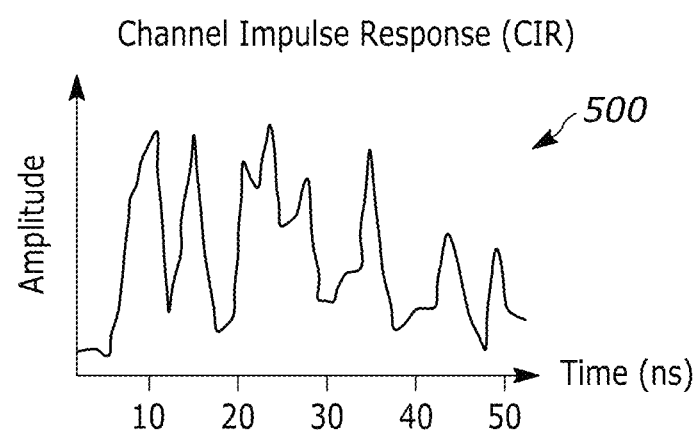
FIGS. 4A, 4B, and 4C illustrate example CIR, CIR amplitude, and power delay profile (PDP) behavior according to the present disclosure.
Figure 4B:
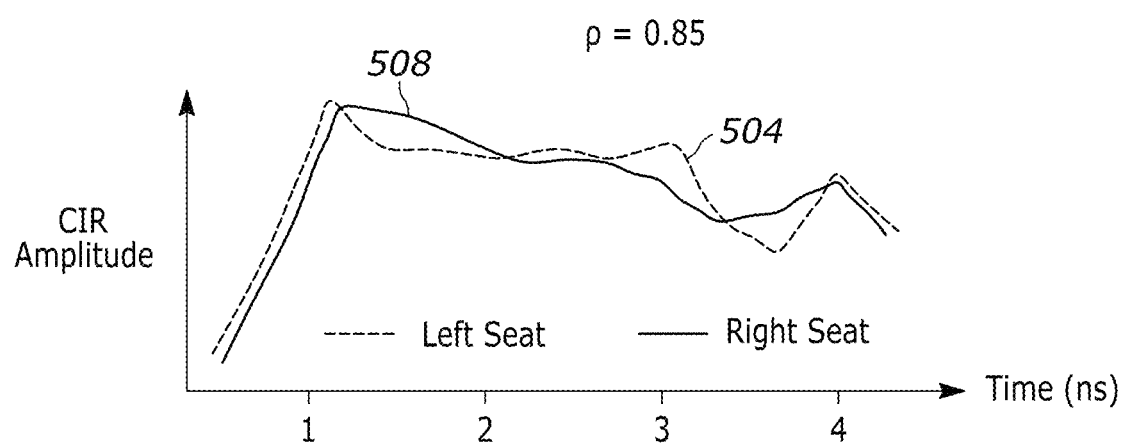
Figure 4C:
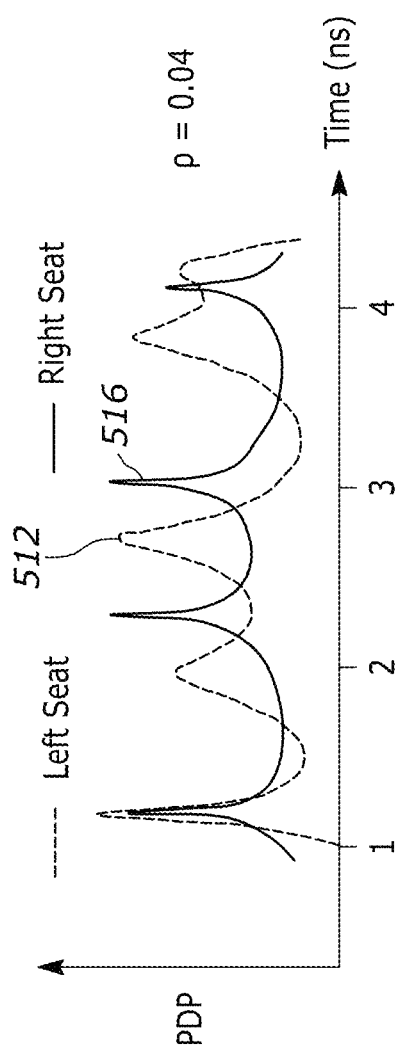

FIGS. 4A, 4B, and 4C illustrate example CIR, CIR amplitude, and PDP behavior according to the principles of the present disclosure. As shown in FIG. 4A, a CIR 500 of a signal received by an example node in an occupancy sensing system has multiple peaks corresponding to respective portions of the signal received (i.e., as received via different signal propagation paths due to reflection, similar to the CIR shown in the graph 210 of FIG. 2). The peaks may have different amplitudes and reception timing.

For some applications, UWB signals include a sequence of data packets and CIR data is used to determine packet arrival time, which may in turn be used to estimate a distance between a transmitting node and a receiving node. The data packet begins with a preamble field comprising sequences of positive and negative pulses (or no pulse). The sequence of pulses in the preamble field is configured to maintain a perfect periodic autocorrelation, enabling the receiver to obtain exact CIR data using a correlator. Accordingly, the receiving node generates and stores a timestamp corresponding to an arrival time of a first signal or path (i.e., the first peak in the CIR 500). The complete CIR data may be stored (e.g., in a PHY layer of the receiving node). In some examples, the CIR data may be used for large-area sensing (e.g., for sensing/counting occupants in a large room), localization of other vehicles, keyless entry, etc. However, for small-area sensing (e.g., vehicle occupancy sensing), CIR data is insufficient for sensing locations of occupants as described below in more detail.

For a given signal portion represented in the CIR 500, amplitudes of respective peaks may be modified based on presence or absence of an occupant. For example, a signal path being altered by an occupant (e.g., by being reflected from the occupant instead of another surface) may result in the amplitude of a respective peak in the CIR 500 being increased or decreased.

FIG. 4B illustrates a similarity of amplitudes of a given peak of the CIR 500 for an occupant in different locations within the vehicle. In an example, UWB devices are implemented in a vehicle to collect first CIR data 504 corresponding to an occupant in a first seat (e.g., a left rear seat) and second CIR data 508 for an occupant in a second seat (e.g., a right rear seat). As an occupant sits in different seats, signal propagation paths are modified (i.e., due to the presence of the human body). However, as shown in FIG. 4B, amplitudes of the peak for the first CIR data 504 and the second CIR data 508 are very similar (e.g., with a correlation p of 0.85). With such a high correlation, detecting which seat is occupied would be difficult if only amplitudes are compared. In other words, although amplitude of a given peak may increase or decrease due to the presence of an occupant (i.e., relative to the amplitude for the same peak when no occupant is present), the change in amplitude does not accurately indicate a location of the occupant.

Conversely, FIG. 4C illustrates example PDP profiles 512 and 516 corresponding to the first CIR data 504 and the second CIR data 508, respectively. As shown, the PDP profiles 512 and 516 have a correlation p of only 0.04). In other words, the PDP profiles 512 and 516 are significantly different from each other (and from a PDP profile of CIR data for a signal received in an unoccupied vehicle). The PDP profiles 512 and 516 can be compared to one or more PDP profiles of respective reference signals to determine presence and locations of occupants in the vehicle. For example, the reference signals may include a signal received in an unoccupied vehicle, signals received when occupants are in one or more known positions (e.g., all possible combinations of occupants in the front and rear seats of the vehicle), etc. The UWB system 100 may store reference data corresponding to the PDP profiles of the reference signals and compare PDP profiles of signals received during operation of the vehicle to the reference data to determine presence and locations of occupants in the vehicle.

Figure 5:
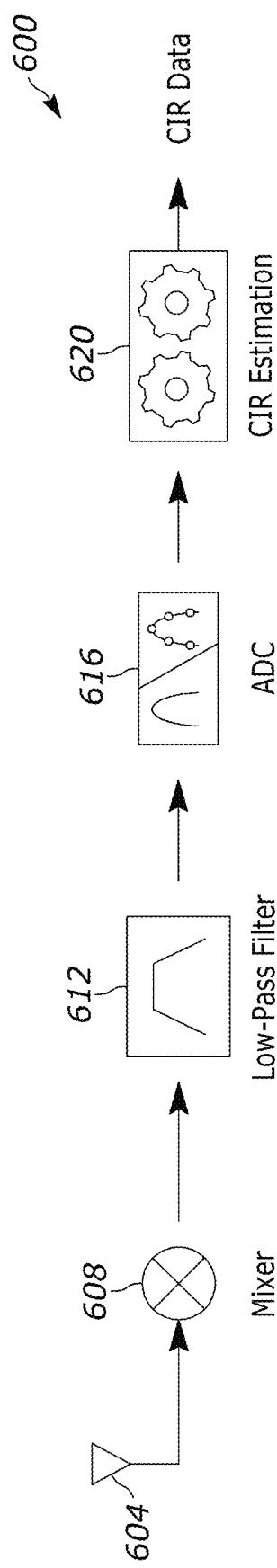
FIG. 5 illustrates an example receiver circuit configured to extract CIR data from a received signal according to the present disclosure.

FIG. 5 illustrates an example receiver circuit or circuitry 600 configured to extract CIR data from a received signal. All or portions of the receiver circuitry 600 may be implemented within one of the nodes 110. Some portions of the circuitry 600 may be implemented in another component or location, such as in the processing system 130.

In an example, $x(\ )$ is a transmitted signal (e.g., of a preamble field of a UWB data packet. The transmitted UWB signal traverses through N signal propagation paths, resulting in copies of the transmitted signal each having a delay $\tau_i$ for a respective i-th path. The delayed copies of x(t) arrive at the receiver side consecutively, yielding a received signal y(t):

$$y(t) \sum_{i=0}^{N-1} a_i e^{-j2\pi f_c \tau_i} x(t - \tau_i),$$

where $f_c$ is a center frequency of the UWB signal and $\alpha_i$ is an attenuation of the i-th path. A corresponding power delay profile can be formulated as follows:

$$h(t) \sum_{i=0}^{N-1} a_i e^{-j2\pi f_c \tau_i} \delta(t - \tau_i),$$

where $\delta(t)$ is a Dirac's delta function. The received signal ( ) is provided to the UWB PHY layer to obtain the CIR data as an estimation of h(t).

The receiver circuitry 600 receives the received signal (e.g., a received UWB signal corresponding to ( ) via an antenna 604. In this example, the UWB signal is processed by a mixer 608, a low-pass filter (LPF) 612, an analog-to-digital converter (ADC) 616, and a CIR estimation circuit 620. For example, the mixer 608 performs a passband to baseband conversion of the received UWB signal to obtain a baseband signal. The LPF 612 provides low-pass filtering to eliminate portions of the baseband signal while retaining desired portions of the baseband signal. The ADC 616 samples the filtered signal (e.g., at 2 ns intervals) to generate time-domain samples of the filtered signal. The time-domain samples are provided to the CIR estimation circuit 620, which applies a correlator to the samples to extract the CIR data. An example correlator h[n] may be defined as:

$$h[n] \sum_{i=0}^{N-1} a_i e^{-j2\pi f_c \tau_i} \operatorname{sinc}\left(n - \frac{\tau_i}{T_s}\right),$$

However, the output of the correlator may still result in ambiguity with respect to specific locations of objects (e.g., occupants) causing changes to the CIR data and the corresponding PDP. For example, the LPF 612 may be configured to perform sinc-shaped filtering, represented by sinc $$(Bt) = \left[\left[\frac{\sin(\pi Bt)}{\pi Bt}\right]\right] \frac{\sin(\pi Bt)}{\pi Bt}.$$

As a result, amplitudes of adjacent peaks corresponding to different signal propagation paths may be very close together, causing the ADC 616 to sample only one of the peaks. Limitations of other components of the receiver circuitry 600 may cause similar ambiguities.

Accordingly, occupancy sensing systems and methods of the present disclosure are configured to implement reverting low-pass filtering and channel frequency response (CFR) transformation to more accurately determine and analyze PDP profiles.

In order to undo the impact of the sinc-shaping of the LPF 612 in accordance with the principles of the present disclosure, the time-domain CIR h[n] is transformed into the frequency domain, resulting in a channel frequency response (CFR):

$$H[k] \sum_{i=0}^{N-1} a_i e^{-j2\pi(f_0 + (k-1)f_\Delta)\tau_i},$$

where $f_0$ represents a center frequency of the leftmost frequency bins and $f_\Delta$ represents channel spacing, which may be 5 MHz in UWB systems. As the sinc function in the frequency domain is equivalent to a rectangular function, the LFR does not affect the CFR as defined above.

However, transforming the CIR data into the frequency domain incorporates all path information into each frequency bin, making it challenging to distinguish individual paths. To illustrate this problem, a phase increment between two consecutive frequency bins for the i-th path is represented as $\Omega i = e^{-j2\pi f^\Delta \tau_i}$. Similarly, $\gamma i = aie-j2\pi f0\tau i$ can be used to represent he complex value of the i-th path on a first (e.g., leftmost) frequency bin. Using these notations, the received CFR of the N paths can be expressed as the following matrix equation:

$$\underbrace{\begin{bmatrix} H[1] \\ H[2] \\ \vdots \\ H[M] \end{bmatrix}}_{H(M \times 1)} = \underbrace{\begin{bmatrix} 1 & 1 & & 1 \\ \Omega_1 & \Omega_2 & & \Omega_N \\ \vdots & \vdots & \cdots & \vdots \\ \Omega_1^{M-1} & \Omega_2^{M-1} & & \Omega_N^{M-1} \end{bmatrix}}_{\Omega(M \times N)} \underbrace{\begin{bmatrix} \gamma_1 \\ \gamma_2 \\ \vdots \\ \gamma_N \end{bmatrix}}_{\Gamma(1 \times N)}, \quad \text{(Equation 1)}$$

where M is the number of frequency bins included in the PDP calculation (e.g., 100 in UWB systems). The process of computing PDP from CIR data involves solving this matrix equation to derive the elements of matrix $\Omega$. However, due to the presence of two unknowns ($\Omega$ and $\Gamma$) on the right-hand side of the matrix equation and only one known (CFR vector H) on the left-hand side of the matrix equation, this equation cannot be straightforwardly solved using standard linear algebra techniques.

The matrix $\Omega$ exhibits the Vandermonde property. Accordingly, occupancy sensing systems and methods according to the present disclosure are configured to use a multiple signal classification (MUSIC) algorithm to solve Equation 1. The MUSIC algorithm is a high-resolution signal classification algorithm used to determine frequencies and estimate direction of arrival of multiple received signals. For implementation of the MUSIC algorithm, the matrix $\Omega$ is referred to as the steering matrix, where each column is known as a steering vector. Originally developed for determining the angle-of-arrival (AoA) of each incident signal in a uniform linear antenna array, the MUSIC algorithm accepts the known left-hand side matrix (corresponding to H in Equation 1) as input and generates an estimate for every element in the steering matrix of Vandermonde shape (which corresponds to H in Equation 5), without requiring knowledge of $\Gamma$. The MUSIC algorithm assumes uncorrelated incident signals and requires a sufficient number of signals to be collected from an antenna array. Consequently, to apply the MUSIC algorithm, H and $\Gamma$ must be matrices with a rank greater than the number of reflected paths N, as opposed to vectors as shown in Equation 1. Accordingly, occupancy sensing systems and methods according to the present disclosure transform H and $\Gamma$ into the required matrices for processing by the MUSIC algorithm while preserving the same steering elements.

The transformation of the CFR vector is motivated by the Spatial Smoothing technique, which rearranges the CFR vector H into a full-rank matrix without altering any of the elements in the steering matrix. The essential idea behind this procedure is that if several subsets of H with the same steering elements as the initial H can be identified, these subsets could be combined to form a full-rank matrix as shown in FIG. 6, which illustrates the selection of subsets of p elements from H to form the columns of the new matrix H'. The new steering matrix, $\Omega'$, is identical to the original $\Omega$. Since H' is the product of the full-rank matrix $\Omega'$ and $\Gamma'$, which is a scaled version of the Vandermonde matrix and also full-rank, the CFR vector H is transformed into a full-rank matrix H'. The size of the matrix $\Omega'$ is p×N, while the size of $\Gamma'$ is N×q. As both matrices are full-rank, the rank of $\Gamma'$ is min(q, N), and the rank of H' is min(p, q, N). To meet the rank requirement for H' and $\Gamma'$, which must exceed the number of reflected paths N, values of p and q are selected that are greater than N. This ensures that the requirement for using the MUSIC algorithm to obtain the PDP is satisfied.

The matrix H' can then be input to the MUSIC algorithm to obtain the high-resolution PDP comprising $\tau 1$ to $\tau N$.

In UWB systems, the number of frequency bins, M, is typically 100, and the number of reflected paths within the 2m×2m in-vehicle area is limited. This implies that there are many choices for the values of p and q. However, if the combination of p and q is not carefully selected, poor PDP performance could result.

Figure 7:
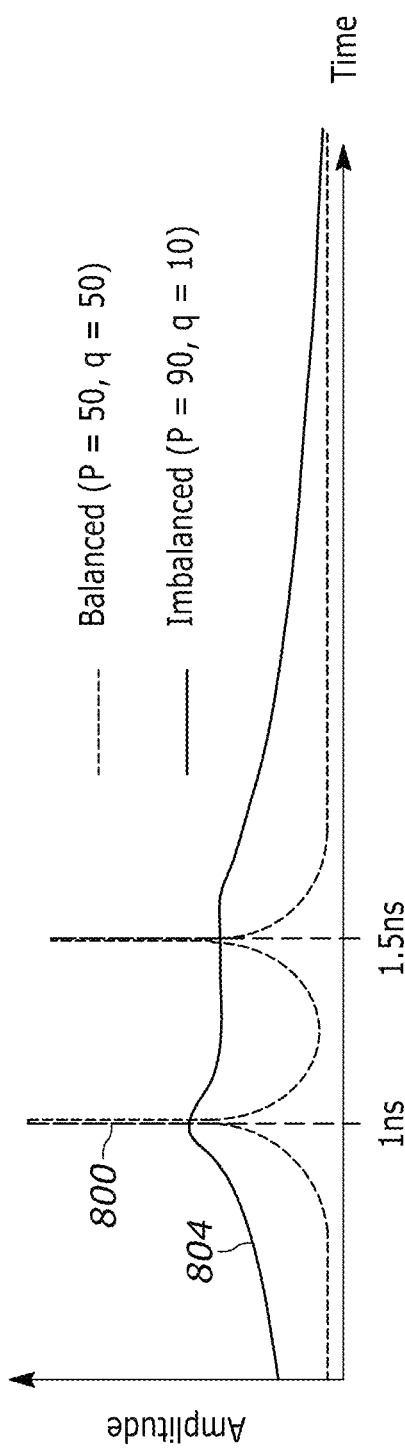
FIG. 7 illustrates example PDP calculation results according to the present disclosure.

FIG. 7 illustrates example PDP calculation results 800 and 804 including peaks at 1 ns and 1.5 ns. At 800, results are shown for balanced p and q values of 50. Conversely, at 804, results are shown for unbalanced p and q values of 90 and 10, respectively. The PDP result obtained using (p=50, q=50) has more significant amplitude peaks than the result obtained with (p=90, q=10). This is because the corresponding steering vectors $[1, \Omega_1, \ldots, \Omega_1^{p-1}]^T$ and $[1, \Omega_2, \ldots, \Omega_2^{p-1}]^T$ are less distinguishable under (p=90, q=10) than under (p=50, q=50). Specifically, the maximum phase change for each steering vector is given by $\Omega_1^{p-1}$ and $\Omega_2^{p-1}$, which are $((p-1))/100$ and $(1.5(p-1))/100$, respectively. When p=10, the difference between these two phases is only $0.095\pi$, which is insufficient to distinguish between the two paths. In a practical low SNR environment, the results could be even more degraded. Since the values of p and q are constrained by the number of frequency bins, M, such that p+q≤M, p and q must be carefully selected to maximize the phase change over the steering vectors. Therefore, by selecting p=q=M/2, occupancy sensing systems and methods of the present disclosure maximize the phase change over the steering vectors, which leads to the maximum achievable SNR.

As the CIR data is obtained from the UWB PHY layer, any hardware imperfections in the components of the PHY layer may result in an inaccurate matrix H' and subsequently affect the PDP calculation. Accordingly, occupancy sensing systems and methods according to the present disclosure implement PDP calculation techniques that are robust and less vulnerable to hardware limitations.

Hardware imperfections can introduce errors in the CIR data, including, but not limited to: (i) carrier frequency offset (CFO), denoted as $f_{CFO}$, which arises due to unsynchronized oscillators in the UWB transmitter and receiver and causes a slight mismatch between the mixer at the receiver side and the center frequency of the transmitted UWB signal; (ii) sampling time offset $\tau_\Delta$, which is caused by unsynchronized ADCs that sample the signal with a random time shift; and (iii) initial phase offset $\theta_\Delta$, which is an inherent and unknown phase value imposed on RF devices when powered on. In the presence of these imperfections, the received CFR is formulated as H[^k] as shown below:

$$H[^k] = \sum_{i=0}^{N-1} a_i e^{-j2\pi(f_{CFO}+f_0+(k-1)f_\Delta)(\tau_i+\tau_\Delta)+\theta_\Delta} = \sum_{i=0}^{N-1} \hat{\Omega}_i^{k-1} \hat{Y}_i,$$

Where $\hat{\Omega}_i = e^{-j2\pi\theta_\Delta(\tau_i+\tau_\Delta)}$ and $\hat{Y}_i = \alpha_i e^{-j2\pi(f_{CFO}+f_0)(\tau_i+\tau_\Delta)+\theta_\Delta}$. The effects of CFO and random initial phase are confined to $\hat{Y}_i$, which implies that these hardware imperfections do not affect the steering matrix. Additionally, since the MUSIC algorithm does not require knowledge of $\hat{Y}_i$ to calculate the steering matrix, any variations in $\hat{Y}_i$ will not alter the PDP calculation result. Therefore, the high-resolution PDP calculation according to the present disclosure is not susceptible to the effects of CFO and random initial phase.

Figure 8:
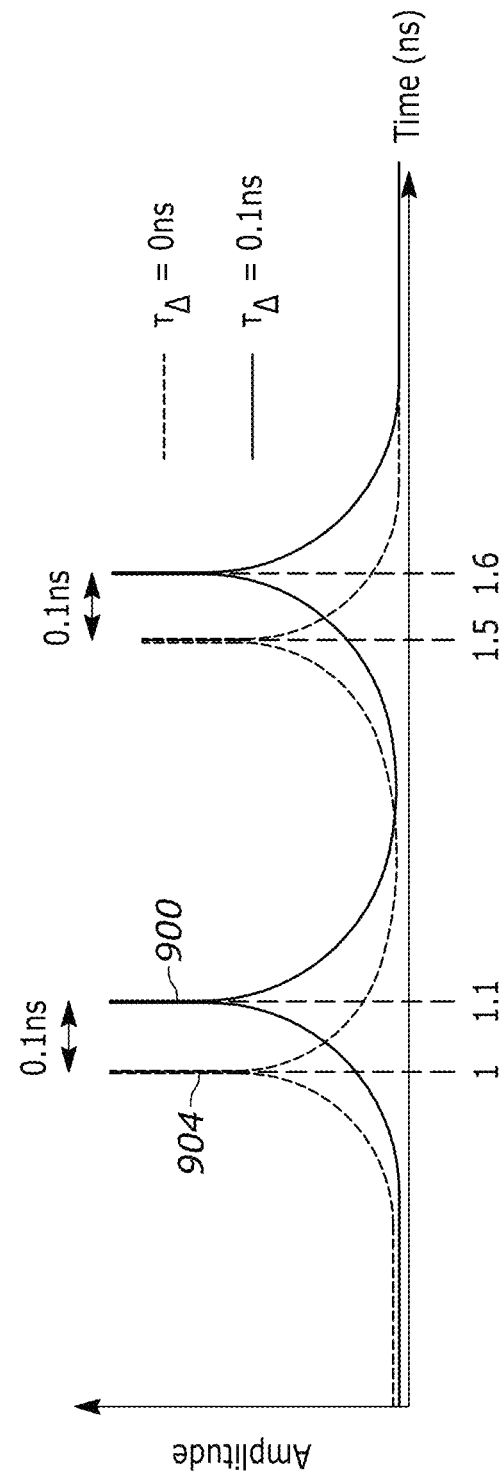
FIG. 8 illustrates examples of PDP estimation with a sampling time offset and without a sampling time offset according to the present disclosure.

FIG. 8 shows examples of PDP estimation with a sampling time offset (at 900) and without a sampling time offset (at 904). The sampling time offset affects all estimated paths simultaneously by introducing a delay of $\tau_\Delta$, which results in a shift of all estimated peaks by the same amount. As shown in FIG. 8, all peaks have a delay of 0.1 ns compared to the case without the sampling offset. The relative distance between two peaks (paths) remains unchanged, irrespective of the sampling offset, which is critical for aligning all calculated PDPs. Accordingly, the high-resolution PDP calculation according to the present disclosure is not affected by the hardware imperfections described above. Accordingly, systems and methods of the present disclosure provide an advantage over existing wireless sensing works, which are significantly impacted by these hardware imperfections and require additional design features to compensate for such imperfections.

Occupancy sensing according to the present disclosure relies on the observation that the human body only affects signal propagation paths that are longer than the line-of-sight (LoS) path (TX-body-RX), while shorter paths remain unaffected. To illustrate this observation, the PDPs obtained under two conditions are compared: an empty vehicle (i.e., without occupants) and a vehicle with a single occupant sitting in the right rear seat (as shown at 1000 in FIG. 9). PDP results for the empty vehicle and the vehicle with one occupant are shown at 1004 and 1008, respectively.

The presence of the occupant in the rear right seat results in a new reflection path and corresponding peak as shown at 1012. While other peaks of the PDP results 1004 and 1008 appear very similar in both amplitude and timing, the new peak 1012 has a delay of 4.1 ns, which is 3.1 ns later than the peak corresponding to the first path (i.e., the leftmost peak). This delay of 3.1 ns corresponds to a distance of 0.93 m, which is the distance of the Tx-body-Rx path, thereby confirming the validity of the observation that the human body only affects signal propagation paths that are longer than the LoS path.

Accordingly, occupancy sensing systems and methods of the present disclosure are configured to comparing the PDP collected without occupants to the PDP obtained for a current occupancy status of the vehicle. As the in-vehicle configured is generally limited to a predetermined (e.g., 2m×2m) area, PDPs within a range of the predetermined area are compared for occupancy detection, while PDPs corresponding to paths outside of this area are disregarded (since these paths correspond to non-Tx-body-Rx paths, such as paths reflected from objects outside of the vehicle). To enhance occupancy detection, systems and methods described herein use multiple UWB devices and simple classification models. With high-resolution PDP detection, even traditional classification models such as support vector machine (SVM) models can achieve 98% accuracy for car occupancy detection.

In some examples, occupancy sensing systems and methods of the present disclosure implement computational cost optimization techniques. For example, as the solver for high-resolution PDP calculation, the MUSIC algorithm has an associated ($p^3$) time complexity, which is dominated by the heavy eigenstructure decomposition of the covariance matrix of H' (size of p×q). However, since p and q have already been optimized, directly reducing these parameters would lead to a decrease in the precision of the PDP.

Figures 9, 10:
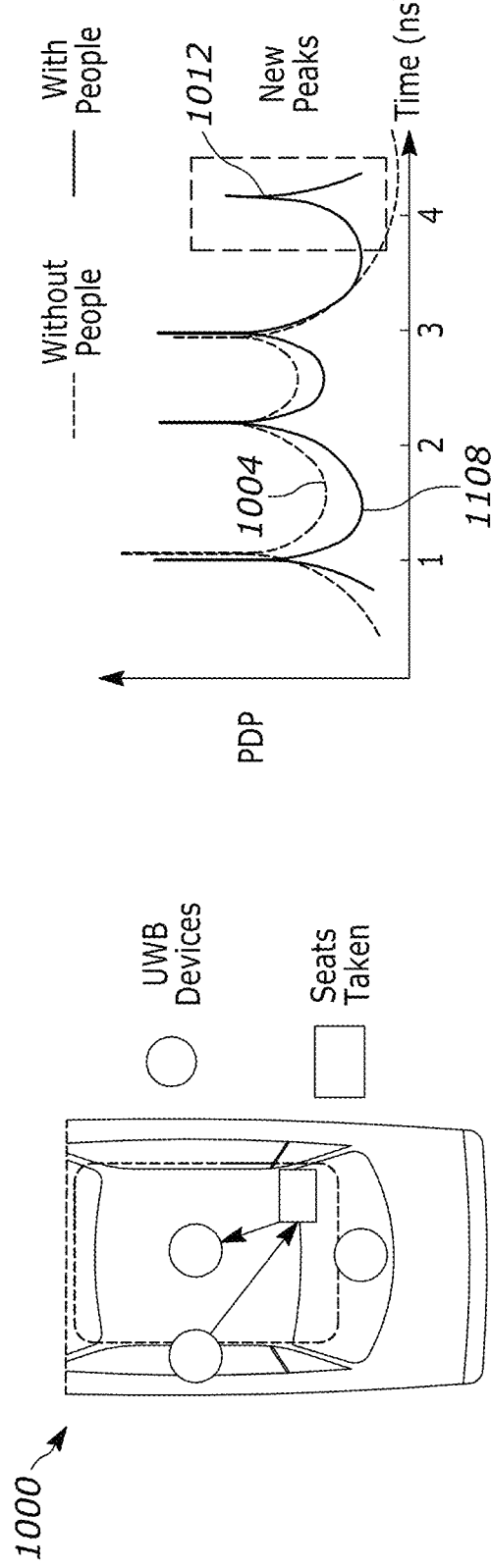
FIG. 9 illustrates a position of an occupant of a vehicle and PDP results for an empty vehicle and the vehicle with one occupant according to the present disclosure.
FIG. 10 illustrates an example technique for reducing complexity reduction without compromising PDP precision according to the present disclosure.

Accordingly, FIG. 10 illustrates an example technique for reducing complexity reduction without compromising PDP precision. As shown, the size of H' is reduced by a factor of D by downsampling the matrix H', resulting in a complexity reduction of $D^3$. For illustration simplicity, p and q are assumed to be multiples of D. By evenly selecting one CFR element from every D elements, we obtain a downsampled CFR matrix, referred to as HD, which can be decomposed into two matrices QD and PD. Although the i-th downsampled steering vector $\vec{\Omega}_i^D = [1, \Omega_i^D, \ldots, \Omega_i^{p-D}]^T$ has only 1/D of the elements compared to the steering vector $[1, \Omega_i, \ldots, \Omega_i^{p-1}]^T$, the PDP calculated from this downsampled matrix remains accurate.

The high precision is ensured by the substantial phase change over the downsampled steering vector. The phase change over the downsampled steering vector is given by $2\pi f_\Delta(p-D)\tau i$, which is $2\pi f_\Delta(D-1)\tau i$ less than the phase change over the original steering vector. The loss, $2\pi f_\Delta(D-1)\tau i$, is negligible, and thus downsampling does not alter the correlation between the steering vectors of different paths.

In some examples, occupancy sensing systems and methods of the present disclosure implement aliasing avoidance techniques. For example, despite the effectiveness of computational cost reduction, the side effect of downsampling is aliasing, where two different path yields the same steering vector. This is formally defined as $\vec{\Omega}_1^D = \vec{\Omega}_2^D$ where $\tau_1 \neq \tau_2$. Then, the two aliased paths have the following property: $2\pi D f_\Delta \tau_1 = 2\pi \overline{D f_\Delta \tau_2} \mod 2\pi \Leftrightarrow \tau_1 = \tau_2 - r/Df_\Delta$, r≥1 (Equation 2), where r is an integer. Aliasing causes erroneous results in high-resolution PDP calculation because the longer path (i.e., $\tau_2$) confuses the computation of the short path (i.e., $\tau_1$) if both paths satisfy the relationship specified in Equation 2. This relationship is easy to satisfy in the in-vehicle environment.

Figure 11:
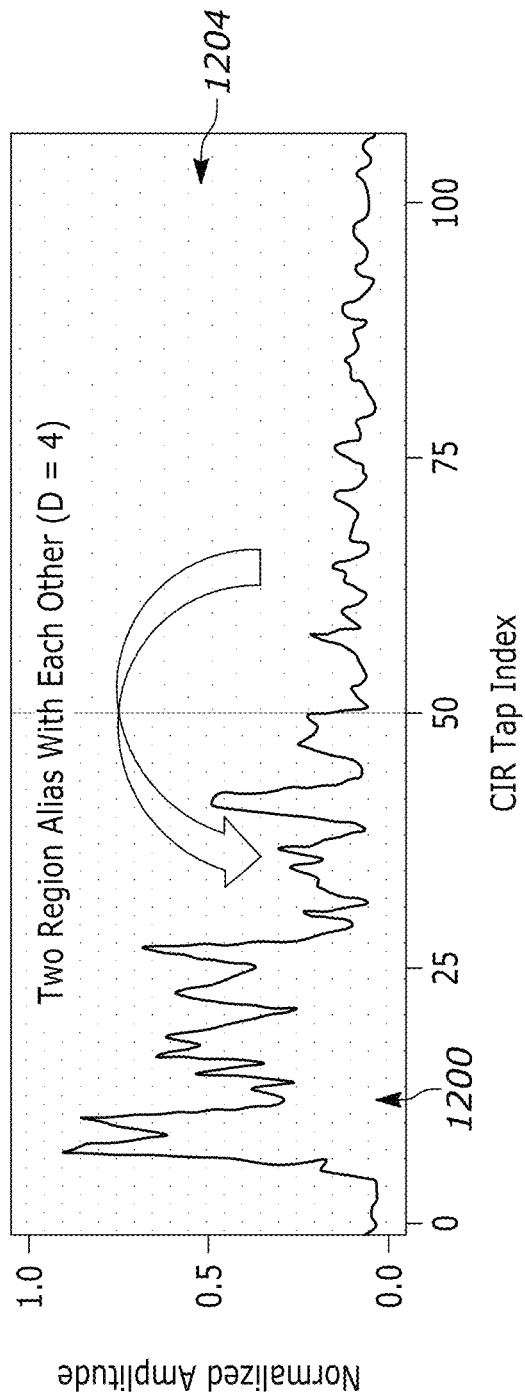
FIG. 11 illustrates normalized amplitudes of CIR data for a first region and a second region according to the present disclosure.

Equation 2 suggests that aliasing occurs at $\tau_1 = \tau_2 - 50$ ns, when D=4, as illustrated in FIG. 11. FIG. 11 shows normalized amplitudes of CIR data for 100 taps (e.g., corresponding to 100 ns), which includes CIR data for a first region 1200 (which may correspond to a first path) and a second region 1204 (which may correspond to a second path). In this example, the second region 1204 may correspond to a signal path outside of the scope of occupancy sensing (e.g., outside of a predetermined area as described above). Since in-vehicle signal propagation has a fairly long tail due to the signal frequently bouncing between compact and metal structures, the aliasing issue is inevitable if downsampling is used. As shown, aliasing occurs in a central 50 ns region.

Figure 12:
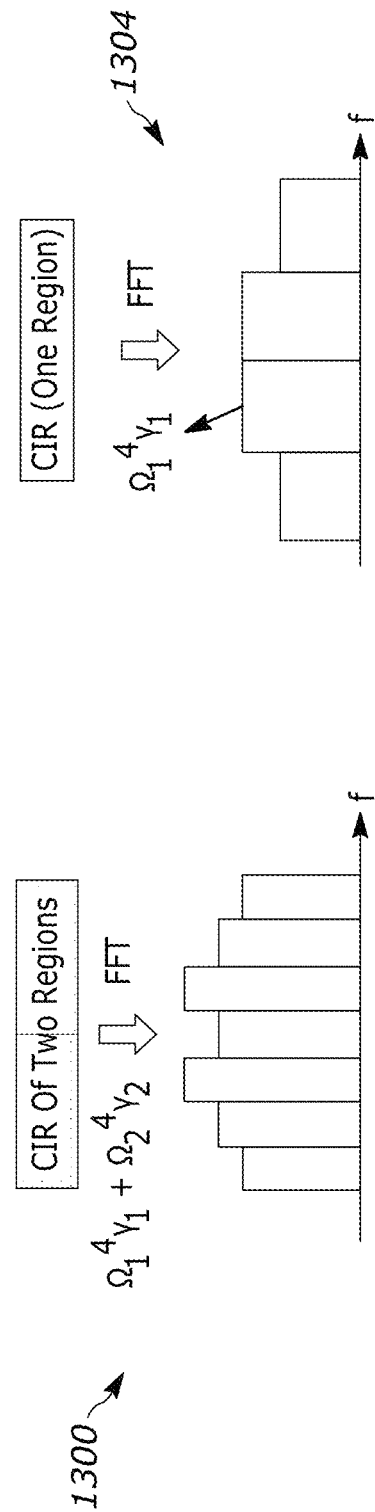
FIG. 12 illustrates Fast Fourier Transform (FFT) results for CIR according to the present disclosure.

Accordingly, to overcome the aliasing issue, occupancy sensing systems and methods of the present disclosure may exclude the regions prone to aliasing (e.g., by excluding a predetermined number of CIR taps, such as the first eight CIR taps). In this manner, the PDP calculation is optimized for the first 4 meters of an environment since this range primarily corresponds to in-vehicle occupancy detection. FIG. 12 illustrates Fast Fourier Transform (FFT) results for CIR data with and without excluding taps corresponding to an aliasing region. For example, FFT results shown at 1300 illustrate aliasing occurring in CIR data corresponding to two regions (e.g., the first region 1200 and the second region 1204 of FIG. 11). Conversely, FFT results shown at 1304 correspond to only CIR data for a desired region as a result of taps being excluded from the CIR data. In other words, by excluding taps in locations where aliasing is likely, the FFT results 1304 only contain paths within the first region. As another benefit, this alias avoidance technique reduces the number of CIR taps required for FFT calculation, which expands channel spacing, or $f_\Delta$, which is equivalent to downsampling the CFR matrix.

Figure 13:
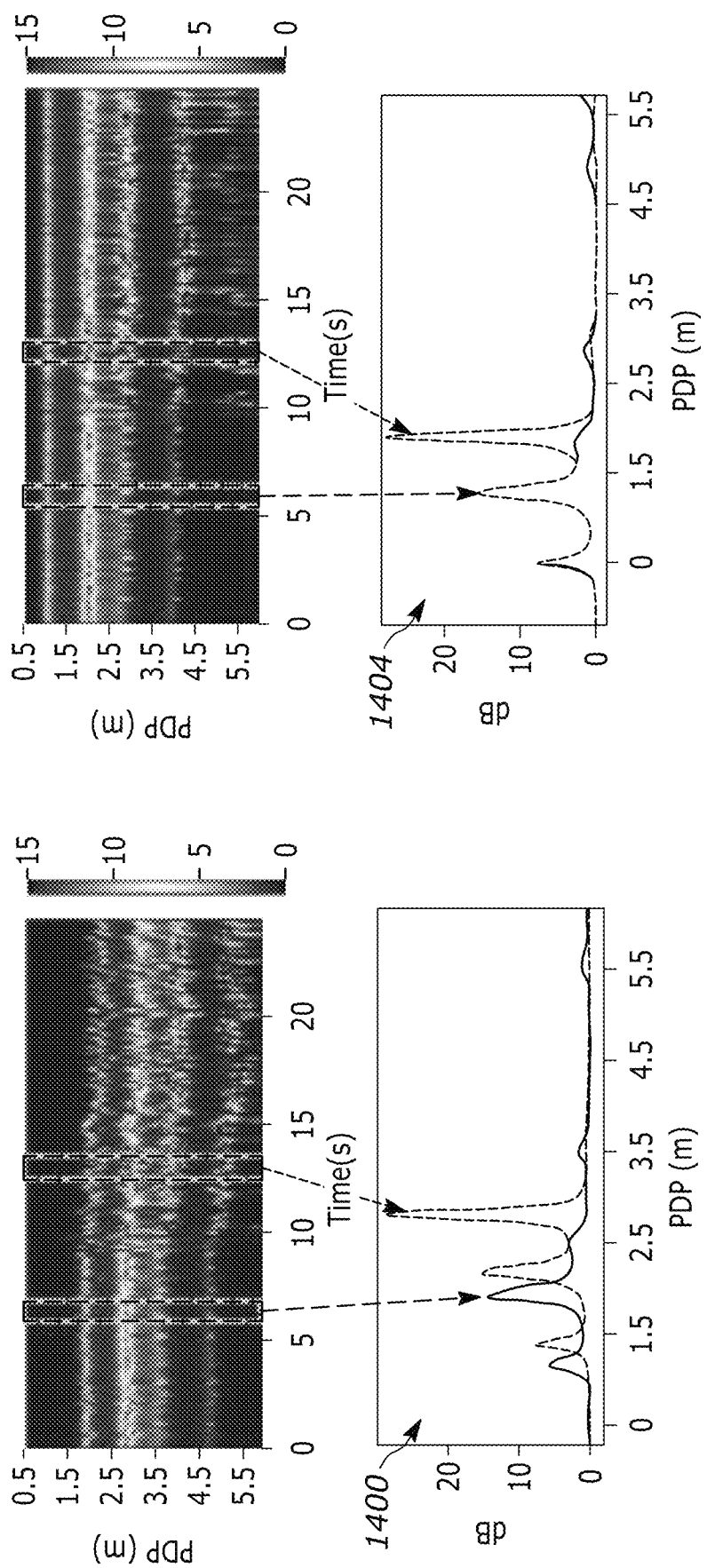
FIG. 13 illustrates example misalignment and synchronization between calculated PDP results according to the present disclosure.

In some examples, occupancy sensing systems and methods of the present disclosure implement synchronization techniques. For example, due to a sampling offset, FIG. 13 illustrates misalignment between two example calculated PDP results at 1400. For a sampling offset of 1 ns, the corresponding misalignment (e.g., 30 cm) between is significant enough to cause an incorrect comparison between PDP results for a given occupancy sensing operation and PDP results of a reference signal. Accordingly, to synchronize the PDP calculated from different UWB packets, systems and methods described herein are configured to align respective first peaks of each of the PDP results as shown at 1404. As described above, the first peak in each PDP result corresponds to the Tx-Rx path (i.e., the LoS path from the transmitting node to the receiving node with no reflections), which is the shortest path relative to other paths (and respective peaks). Therefore, the path length of the first peak is fixed since locations of the corresponding transmitting and receiving nodes are fixed (i.e., attached to the vehicle). Therefore, by aligning the first peak in the PDP results, all PDP results can be synchronized.

Figure 14:
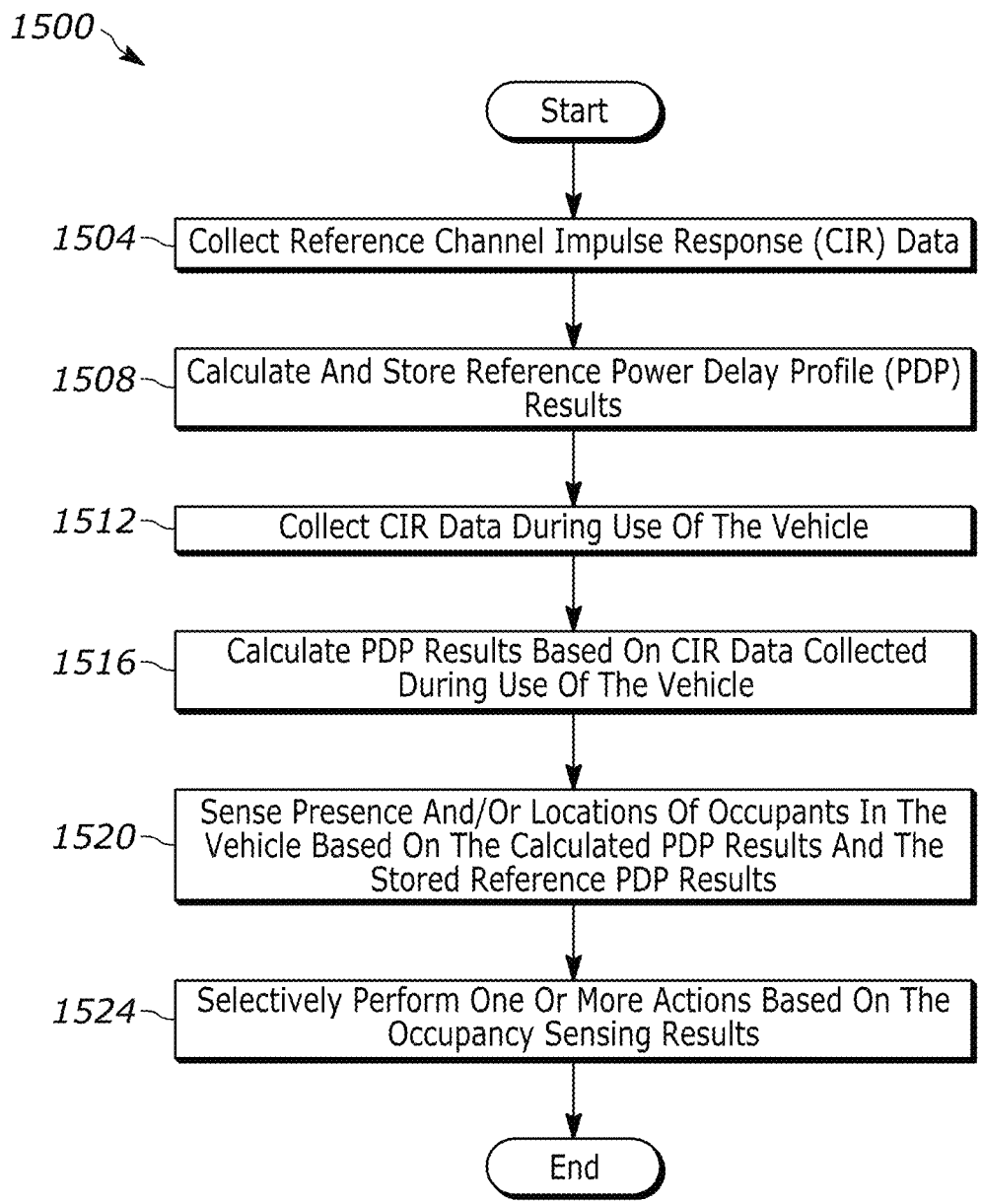
FIG. 14 illustrates steps of an example method for sensing presence and locations of occupants of a vehicle according to the present disclosure

FIG. 14 illustrates steps of an example method 1500 for sensing presence and locations of occupants of a vehicle according to the principles of the present disclosure. For example, one or more processors or processing devices are configured to execute instructions to implement the method 1500, such as one or more of the processors of the systems described herein.

At 1504, the method 1500 includes the step of collecting reference CIR data from a vehicle (e.g., using components of the UWB system 100 described herein). Collecting the reference CIR data may include, but is not limited to, collecting CIR data from an empty vehicle (i.e., a vehicle without occupants), collecting CIR data from a vehicle with occupants in various known seating configurations (e.g., all possible seating combinations, such as only one occupant in all possible seats, two occupants in all possible seats, etc.), and so on. The reference CIR data is collected using UWB devices/nodes in fixed, known positions. Preferably, the UWB devices are arranged in the same locations in which the UWB devices will be located during operation of the vehicle (i.e., by an end user).

At 1508, the method 1500 includes the step of calculating and storing reference PDP results for the reference CIR data (e.g., by the processing system 130, a testing or setup processing system, such as a processing system implemented by a laptop computer or other testing device coupled to the vehicle and the UWB system 100 during manufacturing, setup, calibration, etc., and/or another computing device). The reference PDP results may be calculated using any of the techniques described herein, such as by applying the MUSIC algorithm to the reference CIR data. Storing the reference PDP results may include, but is not limited to, storing (e.g., in the processing system 130 or elsewhere in non-volatile memory of the vehicle, in a cloud computing system, etc.) data correlating respective reference PDP results to various occupant seating arrangements. For example, a vehicle including four possible seating positions may have sixteen possible seating arrangements (including an empty vehicle with no occupants). Accordingly, the method 1500 may store sixteen different reference PDP results.

At 1512, the method 1500 includes the step of collecting CIR data during use of the vehicle (e.g., realtime CIR data). As used herein, "during use of the vehicle" may refer to any use of the vehicle subsequent to steps 1508 and 1508, such as testing of the vehicle and/or the UWB system 100, use of the vehicle by an end user/driver/owner, use of the vehicle in an "on" and/or "off" state, use of the vehicle while parked and/or being driven, use of the vehicle with the driver present and/or not present, use of the vehicle with the doors open and/or closed, etc. Collecting the CIR data may including, for example, collecting the CIR data using components of the UWB system, such as transmitting UWB signals from one or more UWB devices/nodes, receiving the transmitted UWB signals at one or more UWB devices/nodes, calculating CIR data for the received UWB signals, etc.

At 1516, the method 1500 includes the step of calculating PDP results based on the CIR data collected during use of the vehicle. The PDP results may be calculated using the processing system 130, devices/nodes of the UWB system 100, other components of the vehicle, a cloud computing system, and/or combinations thereof. Calculating the PDP results may include implementing any of the PDP calculation techniques described herein, such as applying the MUSIC algorithm to the collected CIR data, applying cost optimization, alias avoidance, and/or synchronization techniques to results of the MUSIC algorithm, etc.

At 1520, the method 1500 includes the step of sensing presence and/or locations of occupants of the vehicle based on the PDP results (i.e. performing occupancy sensing). Sensing presence and/or locations of occupants of the vehicle based on the PDP results may be performed using the processing system 130, devices/nodes of the UWB system 100, other components of the vehicle, a cloud computing system, and/or combinations thereof. Performing occupancy sensing may include, but is not limited to, comparing the calculated PDP results to the stored reference PDP results, selecting the reference PDP results that most closely align with the calculated PDP results, and generating, storing, transmitting, etc. an output (e.g., data indicating occupancy sensing results) based on the selected reference PDP results. For example, the generated output includes data indicating a binary (i.e., a yes or no indication) presence or absence of occupants, a quantity/number of occupants, and/or locations of occupants (i.e., which seats are occupied) in the vehicle.

At 1524, the method 1500 includes the step of selectively performing one or more actions based on the occupancy sensing results. The one or more actions may include, but are not limited to, generating various warnings or performing vehicle system operations/functions, such as adjusting/controlling of heating and cooling systems, activating and deactivating airbags, controlling of interior lighting, controlling an audio/video system (e.g., controlling of specific speakers), transmitting of warnings or notifications to drivers, owners or operators, emergency or law enforcement personnel, etc.

The various steps and logic performed herein can be executed with non-volatile storage, memory, and processors. Non-volatile storage may include one or more persistent data storage devices such as a hard drive, optical drive, tape drive, non-volatile solid-state device, cloud storage or any other device configured to persistently store information. Processor may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. Memory may include a single memory device or a number of memory devices including, but not limited to, random access memory (RAM), volatile memory, non-volatile memory, static random access memory (SRAM), dynamic random access memory (DRAM), flash memory, cache memory, or any other device configured to store information.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of sensing occupancy of a vehicle using ultra-wide band (UWB) communication, the method comprising:

transmitting and receiving a UWB signal within the vehicle;

obtaining channel impulse response (CIR) data corresponding to the UWB signal as received within the vehicle;

calculating power delay profile (PDP) results for the CIR data, wherein calculating the PDP results for the CIR data includes applying a signal classification algorithm to a channel frequency response of the CIR data;

determining, based on the calculated PDP results, the occupancy of the vehicle; and at least one of generating, storing, and transmitting occupancy sensing results based on the determined occupancy of the vehicle, wherein the occupancy sensing results include data that indicates at least one of (i) a presence of occupants within the vehicle, (ii) a number of occupants within the vehicle, and (iii) locations of occupants within the vehicle.

2. The method of claim 1, wherein determining the occupancy of the vehicle includes comparing the calculated PDP results to reference PDP results and determining the occupancy of the vehicle based on the comparison.

3. The method of claim 2, further comprising:
obtaining, with a known arrangement of occupants within the vehicle, the reference PDP results; and
storing the reference PDP results.

4. The method of claim 3, wherein obtaining and storing the reference PDP results includes obtaining and storing a plurality of reference PDP results each corresponding to a different known arrangement of occupants within the vehicle.

5. The method of claim 1, wherein the signal classification algorithm is a multiple signal classification (MUSIC) algorithm.

6. The method of claim 5, wherein calculating the PDP results includes determining the channel frequency response based on the CIR data, generating a matrix based on the channel frequency response, and providing the matrix as an input to the MUSIC algorithm.

7. The method of claim 6, further comprising at least one of:
downsampling the matrix and providing the downsampled matrix to the MUSIC algorithm; and
to obtain the CIR data, filtering the UWB signal as received and excluding selected filter taps to reduce aliasing.

8. The method of claim 1, wherein determining the occupancy of the vehicle includes at least one of detecting an intrusion into the vehicle and detecting gestures performed by occupants of the vehicle.

9. The method of claim 1, further comprising controlling at least one function of the vehicle based on occupancy of the vehicle.

10. The method of claim 9, wherein the at least one function includes at least one of:
control of heating and cooling systems;
activation and deactivation of airbags;
control of interior lighting;
control of an audio and/or video system; and
transmission of warnings or notifications.

11. The method of claim 1, wherein determining the occupancy of the vehicle includes using a machine learning (ML) model configured to calculate the occupancy of the vehicle using the calculated PDP results.

12. An ultra-wide band (UWB) system configured to sense occupancy of a vehicle, the UWB system comprising:
a plurality of UWB devices each configured to transmit, receive, or transmit and receive UWB signals within the vehicle; and
circuitry configured to
obtain channel impulse response (CIR) data corresponding to a UWB signal received by at least one of the plurality of UWB devices within the vehicle;
calculate power delay profile (PDP) results for the CIR data, wherein calculating the PDP results for the CIR data includes applying a signal classification algorithm to a channel frequency response of the CIR data,
determine, based on the calculated PDP results, the occupancy of the vehicle, and
at least one of generate, store, and transmit occupancy sensing results based on the determined occupancy of the vehicle, wherein the occupancy sensing results include data that indicates at least one of (i) a presence of occupants within the vehicle, (ii) a number of occupants within the vehicle, and (iii) locations of occupants within the vehicle.

13. The UWB system of claim 12, wherein, to determine the occupancy of the vehicle, the circuitry is further configured to compare the calculated PDP results to reference PDP results and determine the occupancy of the vehicle based on the comparison.

14. The UWB system of claim 13, wherein the circuitry is further configured to (i) obtain, with a known arrangement of occupants within the vehicle, the reference PDP results and (ii) store the reference PDP results.

15. The UWB system of claim 14, wherein, to obtain and store the reference PDP results, the circuitry is further configured to obtain and store a plurality of reference PDP results each corresponding to a different known arrangement of occupants within the vehicle.

16. The UWB system of claim 12, wherein, to calculate the PDP results, the circuitry is further configured to determine the channel frequency response based on the CIR data, generate a matrix based on the channel frequency response, and provide the matrix as an input to the signal classification algorithm.

17. An ultra-wide band (UWB) system configured to sense occupancy of a vehicle, the UWB system including a processing device configured to execute instructions stored in memory to:
transmit and receive UWB signals within the vehicle;
obtain channel impulse response (CIR) data corresponding to a UWB signal received by at least one of a plurality of UWB devices within the vehicle;
calculate power delay profile (PDP) results for the CIR data, wherein calculating the PDP results for the CIR data includes applying a signal classification algorithm to a channel frequency response of the CIR data;
determine, based on the calculated PDP results, the occupancy of the vehicle; and
at least one of generate, store, and transmit occupancy sensing results based on the determined occupancy of the vehicle, wherein the occupancy sensing results include data that indicates at least one of (i) a presence of occupants within the vehicle, (ii) a number of occupants within the vehicle, and (iii) locations of occupants within the vehicle.

18. The UWB system of claim 17, wherein the processing device is further configured to execute instructions stored in memory to:
compare the calculated PDP results to reference PDP results, wherein the reference PDP results include a plurality of reference PDP results each corresponding to a different known arrangement of occupants within the vehicle; and
determine the occupancy of the vehicle in accordance with a selected one of the different known arrangements of occupants within the vehicle.

* * * * *